(12) United States Patent
Gudlavenkatasiva et al.

(10) Patent No.: US 9,326,112 B2
(45) Date of Patent: Apr. 26, 2016

(54) SENDING USER DEVICE STATUS INFORMATION

(71) Applicant: Verizon Patent and Licensing Inc., Basking Ridge, NJ (US)

(72) Inventors: Bhaskar R. Gudlavenkatasiva, Temple Terrace, FL (US); Premanand Sivakkolundhu, Tampa, FL (US); George L. Hughes, Wesley Chapel, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 268 days.

(21) Appl. No.: 13/627,478

(22) Filed: Sep. 26, 2012

(65) Prior Publication Data

US 2014/0087700 A1 Mar. 27, 2014

(51) Int. Cl.
*H04W 4/16* (2009.01)
*H04M 3/42* (2006.01)

(52) U.S. Cl.
CPC ............ *H04W 4/16* (2013.01); *H04M 3/42374* (2013.01)

(58) Field of Classification Search
CPC ... H04W 4/16; H04L 65/4007; H04L 65/403; H04L 65/1096; H04M 1/654; H04M 1/656; H04M 3/2281; H04M 3/42221; H04M 3/42374; H04M 3/56; H04M 15/83; H04M 15/86; H04M 2203/2016; H04M 2203/2038; H04M 2215/81; H04M 2215/815

USPC ...................... 455/413, 414.1, 405, 415, 352, 455/418–419; 379/32.01–35, 379/207.02–207.05; 709/224
See application file for complete search history.

(56) References Cited

U.S. PATENT DOCUMENTS

| | | | |
|---|---|---|---|
| 8,150,015 B1* | 4/2012 | Whitney et al. | 379/202.01 |
| 2004/0066924 A1* | 4/2004 | Wertsberger | 379/201.01 |
| 2005/0277406 A1* | 12/2005 | Diroo et al. | 455/412.2 |
| 2007/0064906 A1* | 3/2007 | Jain | 379/207.05 |
| 2007/0286389 A1* | 12/2007 | Hyerle et al. | 379/207.01 |
| 2008/0132226 A1* | 6/2008 | Carnall | 455/425 |
| 2008/0143548 A1* | 6/2008 | Grimmelmann et al. | 340/691.5 |
| 2009/0286558 A1* | 11/2009 | Zufi et al. | 455/466 |
| 2009/0291663 A1* | 11/2009 | Schultz et al. | 455/404.2 |
| 2012/0063577 A1* | 3/2012 | Foster | 379/93.02 |
| 2012/0171986 A1* | 7/2012 | Jeong et al. | 455/404.1 |
| 2013/0007240 A1* | 1/2013 | Qiu et al. | 709/223 |

* cited by examiner

*Primary Examiner* — Michael Mapa

(57) ABSTRACT

A network device receives a message that identifies a relationship between a first user device and a second user device, the relationship permitting status information of the first user device to be sent to the second user device when the first user device is communicating with a third user device. The network device receives the status information relating to a communication involving the first user device. The network device determines to send the status information to the second user device, based on the information identifying the relationship stored by the network device; and the network device sends the status information for presentation on the second user device.

20 Claims, 7 Drawing Sheets

SENDING USER DEVICE STATUS INFORMATION

BACKGROUND

When a phone call is made from a first user device to a second user device, the user of the second user device may already be using the second user device for a call with another party. The user, of the first user device, may hear a busy signal while the second user device is being used for the call with the other party.

DETAILED DESCRIPTION OF PREFERRED EMBODIMENTS

The following detailed description of example embodiments refers to the accompanying drawings. The same reference numbers in different drawings may identify the same or similar elements.

Systems and/or methods described herein may set up and create a profile to permit user device status information, regarding a first user device, to be sent to one or more second user devices (e.g., a set top box, a mobile communication device, etc.). The user device status information may include information about that the first user device is busy communicating with a third user device. Further, the user device status information may include information identifying the third user device with which the first user device is communicating. Further, in addition to sending the user device status information, the one or more second user devices may be given an option to receive to a time-delayed recording of a voice communication between the first user device and the third user device.

Figure 1:
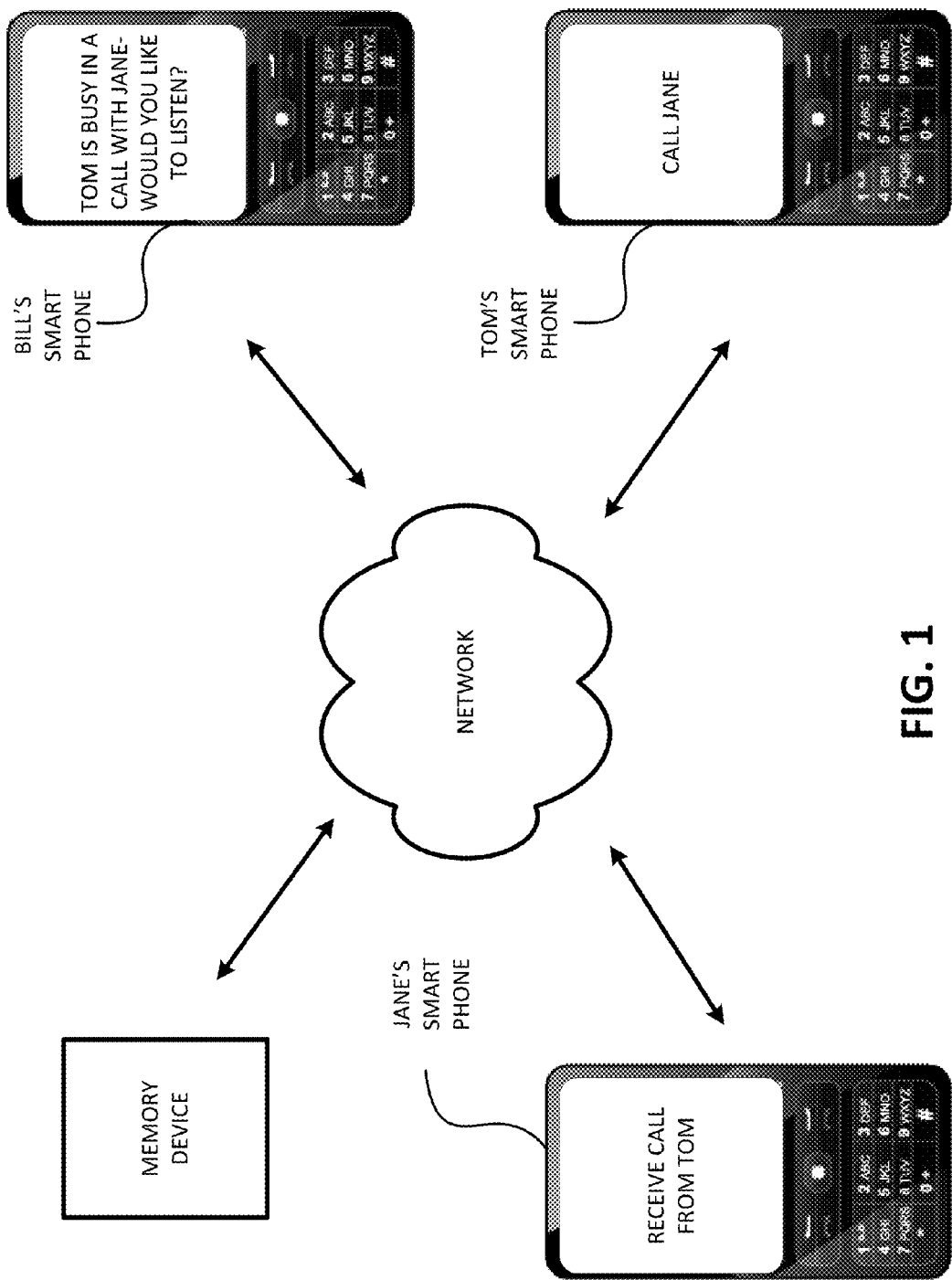
FIG. 1 is a diagram of an overview of an example implementation described herein.

FIG. 1 is a diagram of an overview 100 of an example implementation described herein. As shown in FIG. 1, the example implementation may include Jane's smart phone, Tom's smart phone, Bill's smart phone, a memory device, and a network. Assume that Tom sets up a profile (e.g., using a website on his laptop) to permit information regarding the status of his smart phone (Tom's smart phone) to be sent to Bill's smart phone when Tom is using his smart phone to communicate with another individual. Further, assume that Tom decides (using the profile) to allow Bill's smart phone to receive the option to listen to a time-delayed recording of outgoing and/or incoming communications involving Tom's smart phone.

As shown in FIG. 1, Tom uses his smart phone to call Jane. Jane views the call request from Tom on her smart phone. Jane (using Jane's smart phone) accepts the request from Tom's smart phone. While Tom is on the call with Jane, the voice conversation may be sent to the memory device. The memory device may store the voice conversation between Tom and Jane. The stored voice conversation may be a recording of the voice conservation between Tom and Jane.

As Tom and Jane are talking to each other (using their respective smart phones), Bill decides to call Tom. Bill uses his smart phone to contact Tom's smart phone, via the network. Since Tom's smart phone is communicating with Jane's smart phone, a message may appear on Bill's smart phone indicating that Tom's smart phone is busy with a phone call with Jane, and may also present an option to listen to the voice conversation ("Tom is in a call with Jane—would you like to listen?"). Bill may listen to a time-delayed recording (stored in the memory device) of the voice conversation between Tom and Jane. To receive the time-delayed recording, Bill's smart phone may communicate, via the network, with the memory device. The memory device may send the time-delayed recording, via the network, to Bill's smart phone.

As a result, particular users of user devices may be able to obtain the status of a particular user device, when the particular user device is engaged in a communication with another user device. Further, users of user devices may be able to listen to a time-delayed recording of a voice communication between the particular user device and another user device. This may allow the user, of the particular user device, to keep other users updated on the current status of the user.

Figure 2:
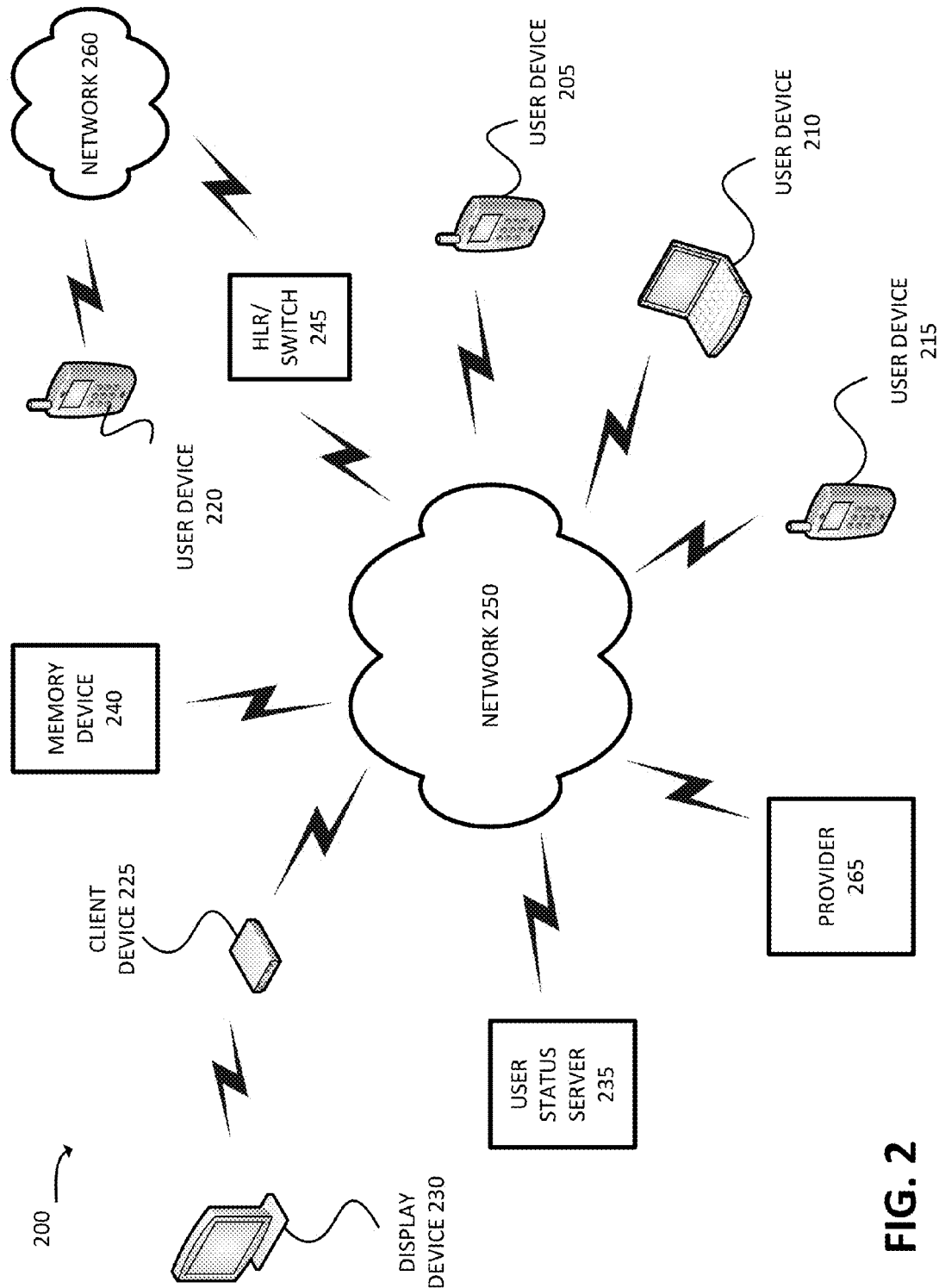
FIG. 2 is a diagram of an example environment in which systems and/or methods described herein may be implemented.

FIG. 2 is a diagram of an example environment 200, in which systems and/or methods described herein may be implemented. As shown in FIG. 2, environment 200 may include a user device 205, a user device 210, a user device 215, a user device 220, a client device 225, a display device 230, a user status server 235, a memory device 240, a home location register/switch 245 (hereinafter referred to as "HLR/switch 245"), networks 250 and 260, and a provider 265. For the purposes of this description, assume that a network service provider, using network 250, provides services (e.g., phone services, Internet services, television services, etc.) to user device 205, user device 210, and/or client device 225. User device 205, user device 210, and/or client device 225 may be associated with a subscriber to network 250. User device 215 may receive services from the network service provider (for network 250) and may be associated with a different subscriber. User device 220 may receive services (e.g., phone services, Internet services, etc.) from another network service provider that operates network 260 to provide the services for user device 220.

User devices 205, 210, 215, and/or 220 may include any communication device that is capable of communicating with a network (e.g., network 250 or network 260). For example, user devices 205, 210, 215, and/or 220 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a tablet computer, a personal gaming system, a set top box, a digital video recorder (DVR), or another type of communication device.

User devices 205, 210, 215, and/or 220 may receive and/or display content. The content may include objects, data, images, audio, video, text, files, and/or links to files accessible via one or more networks. Content may include a media stream, which may refer to a stream of content that includes video content (e.g., a video stream), audio content (e.g., an audio stream), and/or textual content (e.g., a textual stream).

User devices 205, 210, 215, and/or 220 may include a variety of applications, such as, for example, an e-mail application, a video conferencing application, a telephone application, a camera application, a video application, a multimedia application, a music player application, a visual voice mail application, a contacts application, a data organizer application, a calendar application, an instant messaging application, a texting application, a web browsing application, a location-based application (e.g., a GPS-based application), a blogging application, and/or other types of applications (e.g., a word processing application, a spreadsheet application, etc.). Various features of some of the above applications may be part of the content.

Client device 225 may include any communication device that is capable of processing content, storing content, and/or outputting audio and/or video media, including music, images, television content, video content, etc., and/or other types of information, such as text. For example, client device 225 may correspond to a set top box, cable card, digital video recorder (DVR), TV tuner card, computer, or any other device. Functions, described above as being performed by client device 225, may be performed by user devices 205, 210, 215, and/or 220. Additionally, or alternatively, functions, described above as being performed by user devices 205, 210, 215, and/or 220 may be performed by client device 225.

Display device 230 may include a device that is capable of displaying and/or storing information. Display device 230 may display images, television content, video content, and/or other types of information, such as text. For example, display device 230 may correspond to a television, a monitor, or any other type of display screen.

User status server 235 may include one or more server devices that gather, process, search, store, and/or provide information in a manner described herein. User status server 235 may store information about which user device (e.g., user device 215) and/or client device 225 is/are to receive notifications regarding the status of a particular user device (e.g., user device 205).

Memory device 240 may include one or more memory, or network, devices that gather, process, store, and/or provide information described herein. Memory device 240 may store recordings of voice communications between a particular user device (e.g., user device 205) and another device (e.g., user device 215). In some implementations, memory device 240 may be a part of user status server 235. In some other implementations, memory device 240 may be a separate device than user status server 235.

HLR/switch 245 may include a network device, such as a gateway, a router, a switch, a firewall, a network interface card (NIC), a hub, a bridge, a proxy server, an optical add-drop multiplexer (OADM), or some other type of device that processes and/or transfers data. HLR/switch 245 may transmit/receive voice and data between user device 205, user device 210, user device 215, user device 220 and/or client device 225. HLR/switch 245 may connect calls by switching digital voice data packets from one network path to another, and may provide information that supports mobile service subscribers, such as user registration and authentication information.

Additionally, or alternatively, HLR/switch 245 may include one or more network devices that gather, process, search, and/or provide information in a manner described herein. In some implementations, HLR/switch 245 may include one or more databases of subscriber information for a mobile network, such as network 250. HLR/switch 245 databases may be maintained by a subscriber's home carrier and may include pertinent user information, such as address information, account status information, user preferences information, etc.

Network 250 and/or network 260 may include one or more wired and/or wireless networks. Network 250 and network 260 may be implemented as a single network, even though networks 250 and network 260 are shown as separate networks in FIG. 2.

Network 250 and/or network 260 may include a cellular network, a public land mobile network (PLMN), a second generation (2G) network, a third generation (3G) network, a fourth generation (4G) network, a fifth generation (5G) network and/or another network. Additionally, or alternatively, network 250 and/or network 260 may include a local area network (LAN), wide area network (WAN), a metropolitan network (MAN), a telephone network (e.g., the Public Switched Telephone Network (PSTN)), an ad hoc network, an intranet, the Internet, a satellite network, a GPS network, a fiber optic-based network, and/or combination of these or other types of networks. Additionally, or alternatively, network 250 and/or network 260 may support secure communications via a private network (e.g., a virtual private network (VPN) or a private IP VPN (PIP VPN), and/or secure communications via a public network.

Provider 265 may include one or more server devices or other types of computer devices that provide any type of application or application service. Provider 265 may provide an application (e.g., such as Twitter, Facebook, Skype, Vonage) that may be used by user device 205, user device 210, and/or user device 215. Provider 265 may provide any application that can be used to communicate any media stream, such as a video stream, an audio stream, a textual stream, and/or any other type or form of content. Provider 265 may provide applications and/or services, such as games, scripts, and/or messaging services that may be used on user device 210.

The quantity of devices and/or networks illustrated in FIG. 2 is provided for explanatory purposes only. In practice, there may be additional devices and/or networks; fewer devices and/or networks; different devices and/or networks; or differently arranged devices and/or networks than illustrated in FIG. 2. Also, in some implementations, one or more of the devices in environment 200 may perform one or more functions described as being performed by another one or more of the devices in environment 200. Devices of environment 200 may interconnect via wired connections, wireless connections, or a combination of wired and wireless connections.

Figure 3:
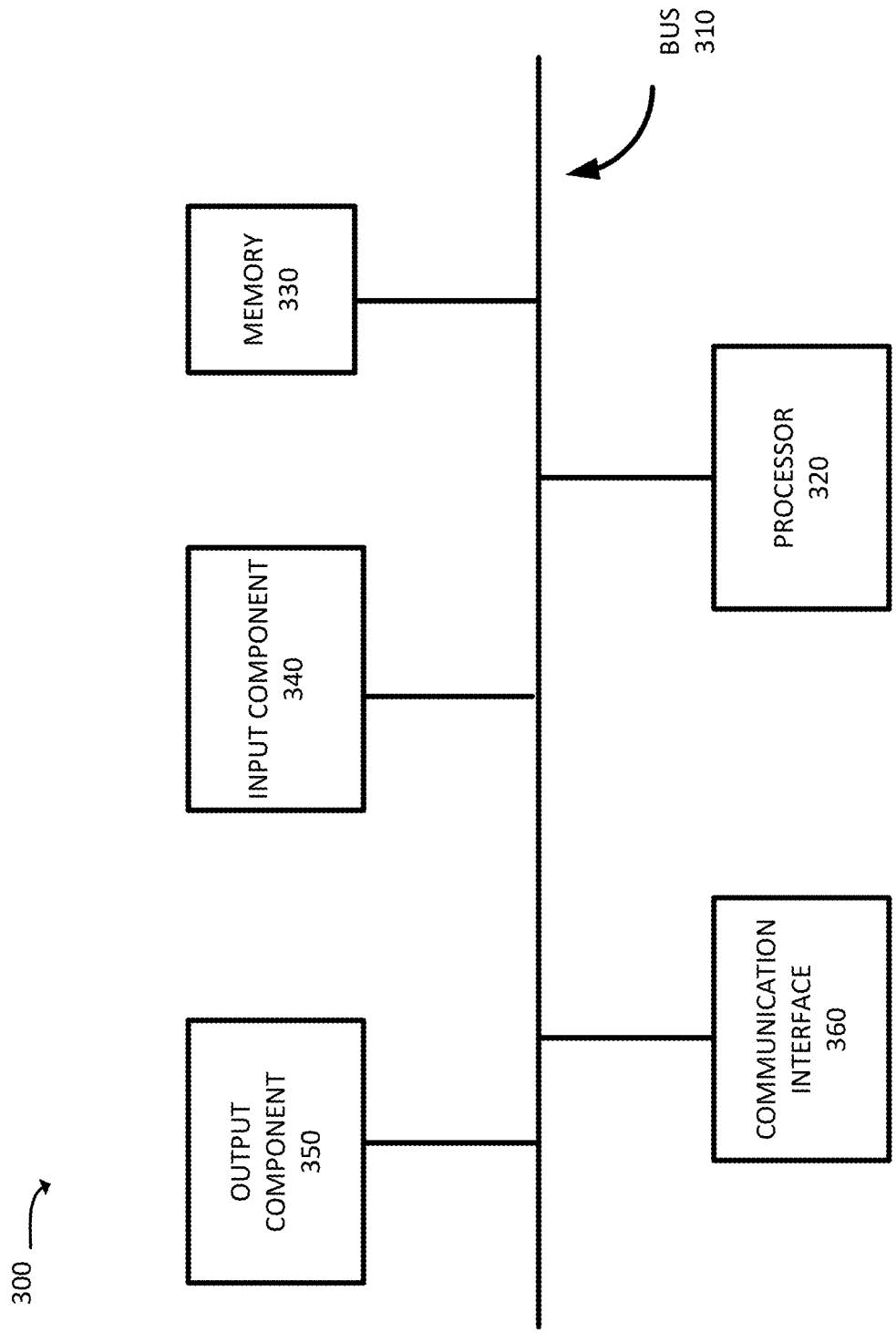
FIG. 3 is a diagram of example components of one or more devices of FIG. 1 and FIG. 2.

FIG. 3 is a diagram of example components of a device 300. Device 300 may correspond to user devices 205, 210, 215, and 220, client device 225, display device 230, user status server 235, memory device 240, HLR/switch 245, and/or provider 265. Alternatively, or additionally, each of user devices 205, 210, 215, and 220, client device 225, display device 230, user status server 235, memory device 240, HLR/switch 245, and/or provider 265 may include one or more devices 300 and/or one or more components of device 300.

As shown in FIG. 3, device 300 may include a bus 310, a processor 320, a memory 330, an input component 340, an output component 350, and a communication interface 360.

Bus 310 may include a path that permits communication among the components of device 300. Processor 320 may include one or more processors, microprocessors, or processing logic (e.g., a field programmable gate array (FPGA) or an application specific integrated circuit (ASIC)) that interprets and executes instructions. Memory 330 may include any type of dynamic storage device that stores information and instructions, for execution by processor 320, and/or any type of non-volatile storage device that stores information for use by processor 320.

Input component 340 may include a component that permits a user to input information to device 300, such as a keyboard, a keypad, a button, a switch, etc. Output component 350 may include a component that outputs information to the user, such as a display, a speaker, one or more light emitting diodes (LEDs), etc.

Communication interface 360 may include any transceiver-like mechanism that enables device 300 to communicate with other devices and/or systems. For example, communication interface 360 may include an Ethernet interface, an optical interface, a coaxial interface, a wireless interface, or the like.

In another implementation, communication interface 360 may include, for example, a transmitter that may convert baseband signals from processor 320 to radio frequency (RF) signals and/or a receiver that may convert RF signals to baseband signals. Alternatively, communication interface 360 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications.

Communication interface 360 may connect to an antenna assembly (not shown in FIG. 3) for transmission and/or reception of the RF signals. The antenna assembly may include one or more antennas to transmit and/or receive RF signals over the air. The antenna assembly may, for example, receive RF signals from communication interface 360 and transmit the RF signals over the air, and receive RF signals over the air and provide the RF signals to communication interface 360. In one implementation, for example, communication interface 360 may communicate with network 250 (and/or network 260) and/or devices connected to network 250 (and/or network 260).

As will be described in detail below, device 300 may perform certain operations. Device 300 may perform these operations in response to processor 320 executing software instructions (e.g., computer program(s)) contained in a computer-readable medium, such as memory 330, a secondary storage device (e.g., hard disk, CD-ROM, etc.), or other forms of RAM or ROM. A computer-readable medium may be defined as a non-transitory memory device. A memory device may include space within a single physical storage device or spread across multiple physical storage devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

While FIG. 3 shows device 300 as having a particular quantity and arrangement of components, in other implementations, device 300 may contain fewer components, additional components, different components, or differently arranged components than depicted in FIG. 3. Additionally, or alternatively, one or more components of device 300 may perform one or more tasks described as being performed by one or more components of device 300.

Figure 4:
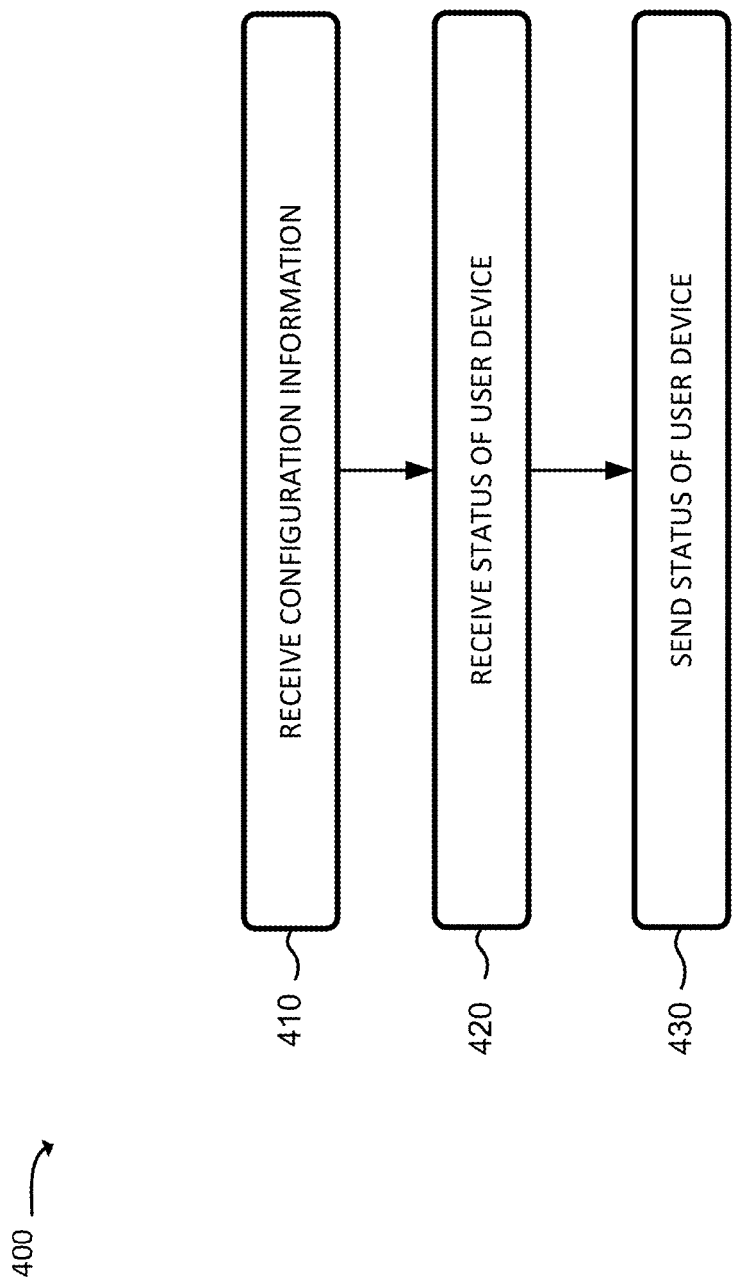
FIG. 4 is a flow chart for sending user device status information.

FIG. 4 is a flow chart of an example process 400 for sending user device status information. In one implementation, process 400 may be performed by user status server 235. In another example implementation, one or more blocks of process 400 may be performed by one or more other devices, such as user device 205, user device 210, user device 215, user device 220, client device 225, and/or memory device 240.

Process 400 may include receiving configuration information (block 410). User status server 235 may receive configuration information from a user device, such as user device 210. A user, using user device 210, may decide, via a user interface (e.g., a web page) to set-up a profile to configure various devices to receive status information of a user device, such as user device 205. The user may enter login information (e.g., user name and password) into user device 210 to allow the user to login into the user's account (associated with the service provider of network 250) to set-up the configuration. User device 210 may send the login information to user status server 235. User status server 235 may verify the login information to determine that the login information is valid and may send a message, indicating such, to user device 210. The user may view the message, on user device 210, that the user is successfully logged into the account.

The user may select one or more user devices from a first list of user devices (e.g., cell phone, smart phone, etc.) displayed, for example, in the profile set-up page on user device 210. The user may choose a user device (such as user device 205) from the first list that will allow other user devices to obtain the status of the selected user device. For example, if the user selects user device 205, then the user has decided that when user device 205 is in use (e.g., for incoming and/or outgoing phone calls), another user device may receive a message indicating that user device 205 is in use. Additionally or alternatively, the user may select, from the first list, an application (e.g., voice over IP (VoIP)) that is associated with a user device (such as user device 210). For example, if the user selects a VoIP application (such as Skype), then the user has decided that when the user is using the VoIP application, one or more other devices may receive a message indicating that the user is using the VoIP application.

The user may also be given a second list of user devices and/or client devices (e.g., displayed in the profile set-up page on user device 210) that may (if selected by the user) receive the status of the selected user device from the first list as described above. For example, the user may select a set top box (e.g., client device 225) to receive the status of the selected user device, (e.g., user device 205). Each user device on the second list may have a respective identifier (e.g., phone number, device identifier, etc.). One or more of the user devices and/or client devices on the second list may be associated with a different user. One or more of the user devices and/or client devices, on the second list, may be associated with the service provider of network 250 (and user status server 235), and/or one or more of the user devices and/or client devices may be associated with a different service provider.

Instead of selecting a client device and/or a user device from the second list, the user may be given the option, via the profile set-up page, to enter a phone number (or another identifier) for a user device that may receive the status information of user device 205. For example, the user may enter a phone number for a smart phone (e.g., associated with the same subscriber, a different subscriber and/or a different network service provider) to receive the status information of user device 205.

The user may also be given a third list of applications (e.g., displayed in the profile set-up page on user device 210) associated with the second list of user devices that may (if selected by the user) receive the status of the selected user device when the application is being used (or logged in) on the selected user device. Each application may be associated with a particular provider 265. For example, if the user selects Twitter, then when the user is using or logged into Twitter (on user device 210) at the same time the user (using user device 205) is on a phone call with a user of user device 220, a message may appear within the user's Twitter page that user device 205 is communicating with user device 220. The message may also be visible to other Twitter users who have permission to view the user's Twitter account messages.

The user may have an option to determine an interval of time when the status information may be sent. For example, the user may select that status information can only be sent to a set top box (client device 225) from 5:00 p.m. to 10:00 p.m., on Mondays, on weekends, etc.

The user may have an option to suspend sending the status information to other user devices (e.g., user device 215 and/or user device 220). For example, the user may decide to suspend sending status information to a set top box (e.g., client device 225) for a one week interval of time in December. Before, and after, the one week interval of time, the set top box may receive the status information. The user may also be able to suspend sending status information to a set top box during a specific television program (e.g., no status information alerts during the football game on a specified television channel).

The user may also specify, using the profile set-up page, which user devices and/or client devices, in the second list, may receive a time-delayed recording of a voice communication between user device 205 and another user device. The user devices and/or client devices permitted to listen in may be different from the user devices and/or client devices permitted to receive the status information of user device 205. The time-delayed recording of a voice communication may be associated with incoming and/or outgoing phone calls involving user device 205 to other user devices (e.g., such as user device 215 or user device 220). This may allow another user to listen to the voice conversation between the user (of user device 205) and a user of the other user device, such as user device 215.

Additionally, the user may specify that when a user device, selected from the first list, is involved in call with a particular recipient, the other user devices and/or client devices, selected from the second list, may receive the time-delayed recording of the voice conversation only for that particular recipient. For example, the user may specify that a selected user device and/or client device, from the second list, may only receive time-delayed recordings associated with emergency phone calls (e.g., 911 phone calls).

The user may also use the profile set-up page to change which user devices (e.g., user devices 210, 215, and/or 220), and/or client devices 225 are to receive the status information of a particular user device (e.g., user device 205) and when the status information (for user device 205) may be sent to other user devices and/or client devices. Alternatively, the user may use the profile to stop sending the status information of the particular user device to other user devices and/or client devices.

User device 210 may send the configuration information, regarding which user devices (from the first list) are to send their status information to selected user devices and/or client devices, from the second list, to user status server 235. User status server 235 may receive the configuration information.

User status server 235 may store the configuration information. User status server 235 may identify one or more multiple network devices that are configured to receive the configuration information. User status server 235 may send a provisioning message that includes the configuration information to one or more network devices and/or switches (e.g., HLR/switch 245). The other network devices and/or switches may notify user status server 235 when one or more of the selected user devices and/or clients devices (based on the configuration as described above) are communicating with each other or are attempting to communicate with each other.

User status server 235 may send the configuration information to provider 265. For example, if the user selected (using the third list in the profile set-up page) a particular application to receive the status information, then user status server 235 may send the configuration information to a provider, such as provider 265, associated with the particular application. Provider 265 may store the configuration information. Provider 265 may use the configuration information to determine when to include the status information of a user device (e.g., user device 205) selected from the first list when the particular application (selected from the third list) is being used on a user device (e.g., user device 215).

Process 400 may include receiving a status of a user device (block 420). For example, a user of user device 205 may be using user device 205 for a voice communication with user device 220, via network devices and/or switches (e.g., HLR/switch 245) in network 250 and/or network 260. The network devices and/or switches may send information to user status server 235 that user device 205 is in use. User status server 235 may store the status information of user device 205. Once user device 205 stops the voice communication with user device 220, user status server 235 may be informed by the other network devices and/or switches regarding the change in the status information. User status server 235 may change the status information of user device 205 to being available for communication. Additionally, or alternatively, a user of user device 205 may be using a VoIP application, via network devices in network 250 and/or network 260. The network devices may send information to user status server 235 that user device 205 is being used for VoIP.

Process 400 may include sending the status of the user device (block 430). For example, user device 215 may request to communicate with user device 205, via network devices and/or switches associated with network 250. User device 205 may be busy communicating with user device 220, as described in block 420. User status server 235 may receive, from one of the network devices and/or switches, information regarding the request from user device 215. User status server 235 may determine (as described in block 420) that user device 205 is busy. User status server 235 may determine based on the configuration information, stored by status server 235, which user devices and/or client devices are permitted to receive the status of user device 205. User status server 235 may determine, based on the configuration information, that user device 215 may receive the status information of user device 205. If user device 215 is not permitted to receive the status information of user device 205, then user status server 235 may send a notification (via other network devices in network 250) to user device 215 that user device 215 is not permitted to receive the status information.

User status server 235 may send, via network devices and/or switches associated with network 250, the status information of user device 205 to user device 215.

The status information may include identification information regarding user device 220 that is in communication with user device 205. The status information may include a name, phone number, and/or other types of information (e.g., the status information may be "Tom is busy in a call with (305) 555-1212"). User device 215 may have an application (associated with user status server 235) that permits user device 215 to receive the status information and display the status information.

Additionally, or alternatively, user status server 235 may send the status information to other user devices and/or client devices selected from the second list via network 250 and/or network 260 (e.g., using HLR/switch 245). For example, when user device 205 is busy (e.g., user device 205 is being used to make a call, user device 205 is being used for a VoIP communication), user status server 235 may determine, based on the configuration information described in block 410, that the status information (e.g., "Tom is busy with on a call with Jane" or "Tom is using Skype") of user device 205 is to be sent to client device 225 without receiving a request from client device 225 to obtain the status information.

Additionally, or alternatively, user status server 235 may determine which selected user devices and/or client devices may receive the status information based on whether selected user devices and/or client devices are using a particular application (selected by the user in the profile set-up page, as described with regard to block 410). For example, if a particular application (e.g., a social networking application) was selected, as described in block 410, then the status information of user device 205 may be sent as a message within the particular application being used on a user device, such as user device 210.

For example, the user may be using or may be logged into a social networking service (provided by provider 265) on user device 210 while the user is also involved in a phone call using user device 205. User device 210 may be receiving the social networking service content from provider 265, via one or more network devices associated with network 250. The one or more network devices may notify user status server 235 that user device 210 is using the social networking service. User status server 235 may determine, based on the configuration in block 410, that the status information is to be provided within the content and/or information associated with the social networking service. User status server 235 may notify provider 265 to include the status information of user device 205 within the content and/or information being sent from provider 265 to user device 210.

Provider 265 may receive the notification and may determine, based on the configuration information (described with regard to block 410), to send the status information as a message within the content associated with the social networking service to user device 210. The social networking service may also allow other users of the social networking service, who have permission from the user of user device 210, to receive the user's status information on the social networking service.

While a series of blocks has been described with regard to FIG. 4, the order of the blocks may be modified in other implementations. Further, non-dependent blocks may be performed in parallel.

Figure 5:
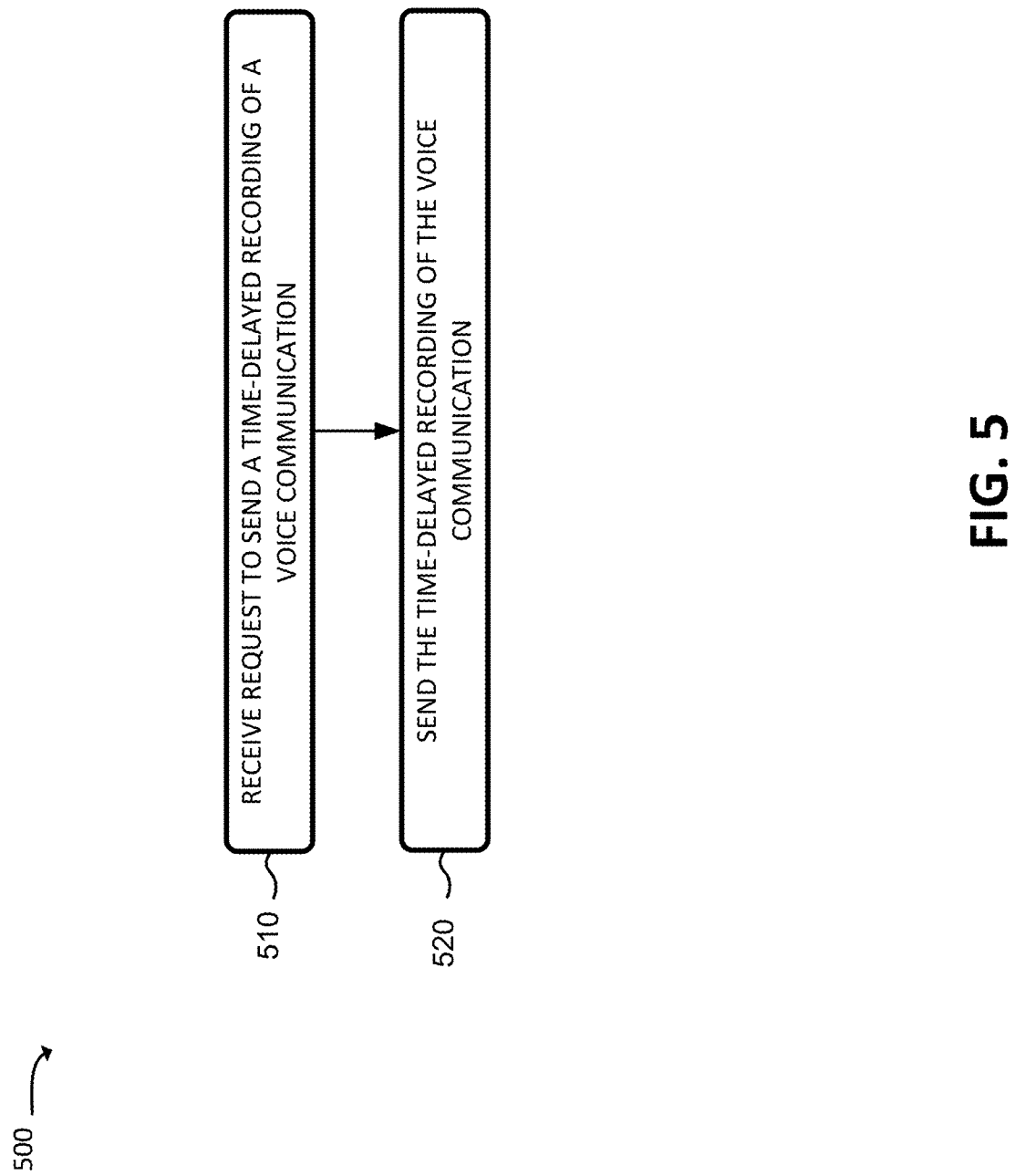
FIG. 5 is a flow chart for sending time-delayed recordings of voice communications relating to a phone call.

FIG. 5 is a flow chart of an example process 500 for sending time-delayed recordings of voice communications relating to a phone call. In one implementation, process 500 may be performed by user status server 235. In another example implementation, one or more blocks of process 500 may be performed by one or more other devices, such as memory device 240.

Process 500 may include receiving a request to send a time-delayed recording of a voice communication (block 510). User status server 235 may receive a request from a user device and/or a client device to send a time-delayed recording of a voice communication to the user device and/or client device. The voice communication may be between a user device, selected from the first list (described with regard to block 410 in FIG. 4) and another user device.

For example, user device 215 may receive, from user status server 235, the status information of user device 205 when user device 205 is busy communicating with user device 220 (described with regard to block 430 in FIG. 4). The status information may include (based on the configuration information stored in user status server 235, described with regard to block 410) an option for a user, of user device 215, to listen to a time-delayed recording of a voice communication between user device 205 and user device 220 (e.g., "Tom is busy talking to Jane, would you like to listen?"). The user of user device 215 may decide to listen to the time-delayed recording. The user of user device 215 may input a command into user device 215 that the user would like to listen to the time-delayed recording. User device 215 may receive the command and may send the request to user status server 235. User status server 235 may determine that, user device 215 may receive the time-delayed recording based on the configuration information (described with regard to block 410 in FIG. 4).

Process 500 may include sending the time-delayed recording of the voice communication (block 520). User status server 235 may have stored the configuration information (described with regard to block 410 in FIG. 4) regarding which selected user devices and/or client devices are permitted to receive the time-delayed recordings of voice communications associated with user device 205. User status server 235 may communicate with memory device 240, via network 250, to receive the time-delayed recording.

Memory device 240 may receive the voice communication information via user status server 235, while the user of user device 205 is having a voice communication with user device 220. User status server 235 may, based on the configuration information (described with regard to block 410), send the voice communication information to memory device 240. As there may be a time associated with sending the voice communication information to memory device 240 (from user device 205), the recording of the voice communication information (in memory device 240) may be a time-delayed recording of the voice communication between user device 205 and another user device.

Memory device 240 may store the voice communication between user device 205 and user device 220. The time-delayed voice recording stored in memory device 240 may be removed based on a request by the user, of user device 205, (via the user's profile page) that the time-delayed recording be deleted. Alternatively, the time-delayed recording stored in memory device 240 may expire at a specified period of time (e.g., after 30 days, the time-delayed recording may be deleted from memory device 240; after the call completes the time-delayed recording, associated with the call, may be deleted from memory 240; etc.).

In one example implementation, memory device 240 may send the time-delayed recording to user status server 235. User status server 235 may receive the time-delayed recording and send the time-delayed recording, via network devices associated with network 250, to user device 215. In another example implementation, memory device 240 may send the time-delayed recording to user device 215, via network devices associated with network 250.

Additionally, or alternatively, user status server 235 may send the time-delayed recording to other selected user devices and/or client devices (according to the configuration information described in block 410 in FIG. 4) based on requests from the other selected user devices and/or client devices. User status server 235 may communicate with the other selected user devices and/or client devices via network 250 and/or network 260 (e.g., using HLR/switch 245).

The time-delayed recording may be transcoded to allow users using different types of devices to listen to the time-delayed voice recording. For example, client device 225 may transcode the time-delayed recording to allow a user of a display device 230 (e.g., a television) to listen to the time-delayed recording. The user, receiving the time-delayed recording, may use various user controls, such as pausing, forwarding, rewinding, and stopping, to listen to the time-delayed recording.

While a series of blocks has been described with regard to FIG. 5, the order of the blocks may be modified in other implementations. Further, non-dependent blocks may be performed in parallel.

Figure 6A:
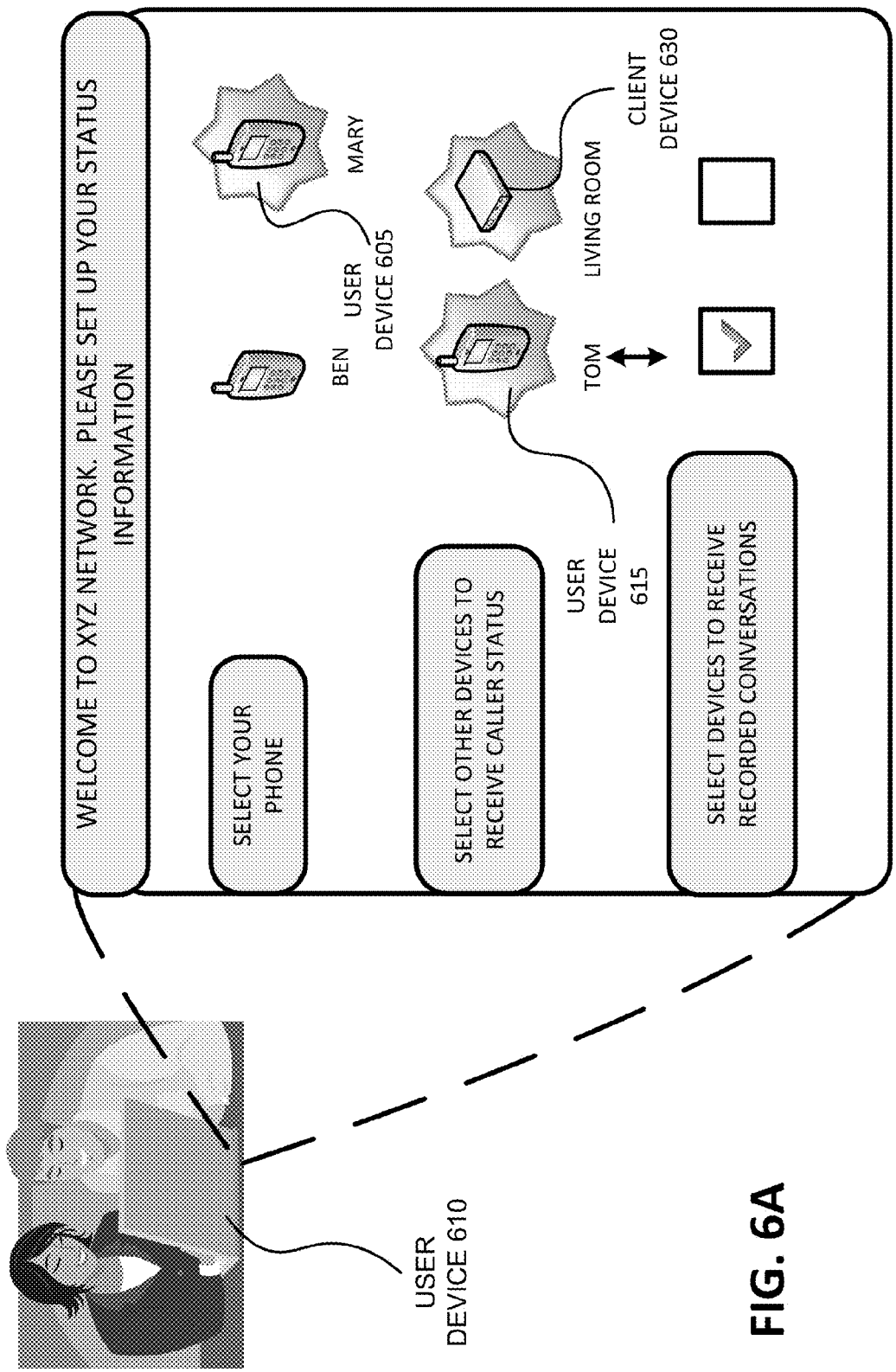
FIGS. 6A-6B are diagrams of an example process for sending user device status information.
Figure 6B:
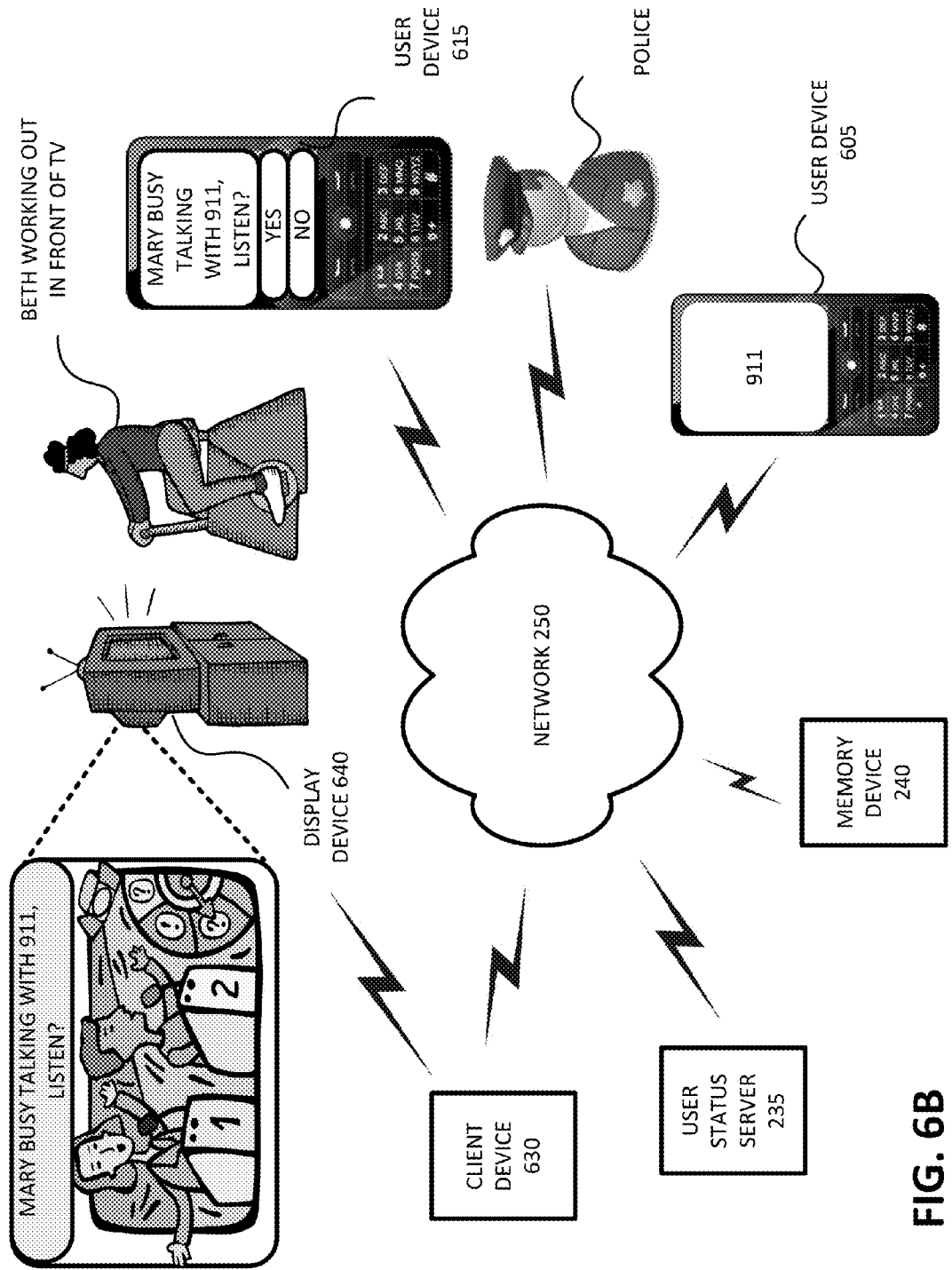

FIGS. 6A-6B are diagrams of an example process for sending user device status information. FIG. 6A shows user device 605, user device 610, user device 615, and client device 630; and FIG. 6B shows user status server 235, memory device 240, network 250, user device 605, user device 615, client device 630 and display device 640. User device 610 may correspond to user device 210, described with regard to FIG. 2. User device 605 may correspond to user device 205, described with regard to FIG. 2. User device 615 may correspond to user device 215, described with regard to FIG. 2. User device 630 may correspond to user device 230, described with regard to FIG. 2. Display device 640 may correspond to user device 240, described with regard to FIG. 2.

In FIG. 6A, a user ("Mary"), of user device 610, decides to set up a configuration of different user devices to receive status information regarding her own smart phone (user device 605) when Mary is using her smart phone to communicate with other user devices. Mary decides that she would like to have Tom's smart phone (user device 615) and the set top box (client device 630) in Mary's living room to receive the status information. Additionally, Mary decides that she would like Tom to also receive a time-delayed recording of a voice communication whenever Mary is making a 911 emergency call from user device 605. Assume that user device 605, user device 615, and client device 630 are all provided services by the same network service provider.

As shown in FIG. 6B, Mary's sister, Beth, is working out in front of the living room television in Mary's house. Mary is outside a shopping mall when she witnesses a robbery in the parking lot. Mary decides to call the police by dialing 911. When Mary begins to communicate with the police, via 911, information, regarding the communication, is sent to user status server 235. User status server 235 may receive the message and determine, based on the configuration information in FIG. 6A, to send a message to client device 630, via network 250. Client device 630 may send the message to display device 640 and Beth may view the message (Mary busy calling 911) on display device 640. Since Mary did not select providing the option to listen to the time-delayed voice conversation on the set top box, Beth does not have the ability to select that particular option on display device 640. At the same time, based on the configuration, user status server 235 may send the voice communication between Mary and the police to memory device 240. Memory device 240 may store the voice communication.

Tom (using user device 615) may attempt to communicate with Mary. When user device 615 requests to communicate with user device 605, information regarding the request is sent to user status server 235. User status server 235 may determine that user device 605 is busy. User status server 235 may determine (based on Tom's MDN or another identifier) that a notification be sent to user device 615 indicating the status of user device 605. User status server 235 may also determine that user device 615 may also (based on the configuration information) receive time-delayed voice recordings when user device 605 is being used to make 911 phone calls.

User status server 235 may send a message, via network 250, to user device 615 indicating that user device 605 is busy and that Tom (the user of user device 615) may listen to the phone conversation. Thus, Tom may view on his smart phone (user device 605) the message "Mary busy talking with 911, listen?" Tom may decide that he would like to listen to the time-delayed recording of the voice conversation between Mary and the police, so Tom selects the "YES" option.

User device 615 may send a request to user status server 235 that user device 615 would like to receive the time-delayed recording regarding the 911 phone call being made by user device 605. User status server 235 may receive the request and send a notification, via network 250, to memory device 240. Memory device 240 may send the time-delayed recording of the voice communication (between Mary and the police) to user device 615 until the voice conversation (by Mary) ends or when Tom decides that he does not wish to listen anymore.

As a result, particular users of user devices may be able to obtain the status of a particular user device, when the particular user device is engaged in a communication with another user device. Further, users of user devices may be able to listen to a time-delayed recording of a voice communication between the particular user device and another user device. This may allow the user, of the particular user device, to keep other users updated on the current status of the user.

The foregoing description of implementations provides illustration and description, but is not intended to be exhaustive or to limit the implementations to the precise form disclosed. Modifications and variations are possible in light of the above disclosure or may be acquired from practice of the implementations.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising: receiving, by a network device and from a first user device, registration information identifying a second user device and a relationship between the first user device and the second user device, the registration information including information identifying an application being utilized by the second user device during a communication between the first user device and a third user device, the first user device selecting the second user device from one or more user devices, and the relationship permitting first status information of the first user device to be sent to the second user device when the first user device is communicating with the third user device, the first status information including: information indicating that there is the communication between the first user device and the third user device, and information identifying the third user device; storing, by the network device, the registration information; receiving, by the network device, the first status information relating to the communication between the first user device and the third user device; determining, by the network device, that the second user device is utilizing the application during the communication between the first user device and the third user device; determining, by the network device and based on the stored registration information and the first status information, to provide the first status information to the second user device, without establishing a connection between the first user device and the second user device and without the second user device communicating with the first user device, based on the communication between the first user device and the third user device and based on the second user device attempting to communicate with the first user device; and providing, by the network device and based on determining to provide the first status information to the second user device, the first status information to the second user device, via the application being utilized by the second user device during the communication between the first user device and the third user device, the application displaying the first status information to a user of the second user device and to other users, using different user devices, that are permitted to view the application being utilized by the second user device.

2. The method of claim 1, further comprising: receiving, based on providing the first status information to the second user device, a selection of a prompt associated with the first status information; and providing, based on receiving the selection of the prompt, a time-delayed voice recording of the communication to the second user device.

3. The method of claim 1, further comprising:
receiving additional information that identifies a second relationship between the first user device and a fourth user device,
the second relationship permitting second status information of the first user device to be sent to the fourth user device when the first user device is communicating with the third user device and the fourth user device is using a particular application;
storing the additional information identifying the second relationship;
determining, based on the stored additional information identifying the second relationship, to send the second status information to the fourth user device; and
sending, based on determining to send the second status information, the second status information to the fourth user device for display within the particular application.

4. The method of claim 1, where
the first user device is associated with a first account, and the second user device is associated with a second account, the first account being different than the second account.

5. The method of claim 1, where the first status information further includes an identifier for the first user device.

6. The method of claim 1, further comprising: receiving a notification to remove the stored registration information; removing, based on receiving the notification, the stored registration information; and discontinuing, based on removing the stored registration information, to provide the first status information.

7. The method of claim 1, further comprising: receiving information to change the relationship, between the first user device and the second user device, to a new relationship, the new relationship being between the first user device and a fourth user device, the fourth user device being different than the second user device; and providing, based on receiving the information to change the relationship, the first status information to the fourth user device.

8. A non-transitory computer-readable medium storing instructions, the instructions comprising: one or more instructions that, when executed by one or more processors of one or more network devices, cause the one or more processors to: receive, from a first user device, registration information identifying a second user device and a relationship between the first user device and the second user device, the registration information including information identifying an application being utilized by the second user device during a communication between the first user device and a third user device, the first user device selecting the second user device from one or more user devices, and the relationship permitting first status information of the first user device to be sent to the second user device when the first user device is communicating with the third user device, the first status information including: information indicating that there is the communication between the first user device and the third user device, and information identifying the third user device; receive the first status information relating to the communication between the first user device and the third user device; determine that the second user device is utilizing the application during the communication between the first user device and the third user device; determine, based on the registration information identifying the relationship and the first status information, to provide the first status information to the second user device based on the communication between the first user device and the third user device, based on the second user device attempting to communicate with the first user device, without establishing a connection between the first user device and the second user device, and without the second user device communicating with the first user device; and
provide, based on determining to provide the first status information to the second user device, the first status information to the second user device, via the application being utilized by the second user device during the communication between the first user device and the third user device, the application displaying the first status information to a user of the second user device and to other users, using different user devices, that are permitted to view the application being utilized by the second user device.

9. The computer-readable medium of claim 8, where the one or more instructions to determine to provide the first status information include: one or more instructions to determine to provide, to the second user device, identification information for the first user device and identification information for the third user device.

10. The computer-readable medium of claim 8, where the instructions further include: one or more instructions to receive additional information indicating that the first status information is to be provided to a client device, the client device being different than the second user device; and one or more instructions to provide, based on receiving the additional information, the first status information to the client device.

11. The computer-readable medium of claim 8, where the instructions further include: one or more instructions to receive information identifying a second relationship between the first user device and a particular application, the second relationship permitting second status information of the first user device to be provided to the particular application when the first user device is communicating with the third user device and when the particular application is being used by a fourth user device; one or more instructions to determine, based on the information identifying the second relationship, to provide the second status information to the fourth user device; and one or more instructions to provide the second status information to the fourth user device when the fourth user device is using the particular application.

12. A system comprising: one or more network devices to:
receive, from a first user device, registration information identifying a second user device and a relationship between the first user device and the second user device, the registration information including information identifying an application being utilized by the second user device during a communication between the first user device and a third user device, the first user device selecting the second user device from one or more user devices, and the relationship permitting first status information of the first user device to be sent to the second user device when the first user device is communicating with the third user device, the first status information including: information indicating that there is the communication between the first user device and the third user device, and information identifying the third user device; store the registration information; receive the first status information relating to the communication between the first user device and the third user device; determine that the second user device is utilizing the application during the communication between the first user device and the third user device; determine, based on the stored registration information and the first status information, to provide the first status information to the second user device based on the communication between the first user device and the third user device, based on the second user device attempting to communicate with the first user device, without establishing a connection between the first user device and the second user device, and without the second user device communicating with the first user device; and provide, based on determining to provide the first status information to the second user device, the first status information to the second user device, via the application being utilized by the second user device during the communication between the first user device and the third user device, the application displaying the first status information to a user of the second user device and to other users, using different user devices, that are permitted to view the application being utilized by the second user device.

13. The system of claim 12, where, when receiving the registration information, the one or more network devices are to: receive information identifying a time period during which the first status information is to be provided to the second user device, and where, when providing the first status information to the second user device, the one or more network devices are to: provide the first status information to the second user device only during the time period.

14. The system of claim 12, where, when receiving the registration information, the one or more network devices are to: receive information identifying an a particular application that, when being used by a fourth user device, permits the first status information to be sent to the fourth user device, and where, when sending the first status information to the second user device, the one or more network devices are to: send the first status information to the fourth user device when the fourth user device is using the particular application.

15. The system of claim 12, where, when receiving the registration information, the one or more network devices are to: receive information identifying a time period during which the first status information is not to be provided to the second user device, and where, when providing the first status information to the second user device, the one or more network devices are to: prevent the first status information from being provided to the second user device during the time period.

16. The system of claim 12, where the one or more network devices are further to: receive additional information identifying a second relationship between the first user device and a client device, the second relationship permitting second status information, regarding the first user device, to be sent to the client device when the first user device is communicating with the third user device; store the additional information identifying the second relationship; determine, based on the stored additional information identifying the second relationship, to send the second status information to the client device; and send, based on determining to send the second status information, the second status information to the client device.

17. The system of claim 12, where the one or more network devices are further to: receive information associated with a request to associate a time period during which the first status information is permitted to be provided to the second user device; and provide, based on the received information associated with the request to associate the time period, the first status information to the second user device only during the time period.

18. The system of claim 12, where the one or more network devices are further to: receive additional information identifying a second relationship between the first user device and a fourth user device, the second relationship permitting a time-delayed voice recording to be sent to the fourth user device, the time-delayed voice recording being based on the communication between the first user device and the third user device; store the additional information identifying the second relationship; determine, based on the stored additional information identifying the second relationship, to send the time-delayed voice recording to the fourth user device; and cause, based on determining to send the time-delayed voice recording, the time-delayed voice recording to be sent to the fourth user device.

19. The system of claim 18, where the one or more network devices are further to:
transcode the time-delayed voice recording to permit the time-delayed voice recording to be audible.

20. The system of claim 18, where, when receiving the additional information identifying the second relationship, the one or more network devices are to:
receive information identifying that the fourth user device is to only receive the time-delayed voice recording when the time-delayed voice recording is associated with a first type of communication; and
where, when causing the time-delayed voice recording to be sent to the fourth user device, the one or more network devices are to:
cause only the time-delayed voice recording associated with the first type of communication to be sent to the fourth user device.

* * * * *